US012663968B2

(12) United States Patent
Bax et al.

(10) Patent No.: US 12,663,968 B2
(45) Date of Patent: Jun. 23, 2026

(54) AUTOMATIC VALIDATION OF COMPUTER-GENERATED CODE METHOD AND APPARATUS

(71) Applicant: YAHOO ASSETS LLC, New York, NY (US)

(72) Inventors: Eric Bax, Sierra Madre, CA (US); Arundhyoti Sarkar, Mountlake Terrace, WA (US); Ruchita Garde, Jersey City, NJ (US)

(73) Assignee: YAHOO ASSETS LLC, New York, NY (US)

( * ) Notice: Subject to any disclaimer, the term of this patent is extended or adjusted under 35 U.S.C. 154(b) by 202 days.

(21) Appl. No.: 18/475,960

(22) Filed: Sep. 27, 2023

(65) Prior Publication Data

US 2025/0103308 A1     Mar. 27, 2025

(51) Int. Cl.
*G06F 8/41* (2018.01)
*G06F 8/33* (2018.01)
*G06F 40/58* (2020.01)

(52) U.S. Cl.
CPC ................ *G06F 8/427* (2013.01); *G06F 8/33* (2013.01); *G06F 40/58* (2020.01)

(58) Field of Classification Search
CPC ............. G06F 8/427; G06F 8/33; G06F 40/58
USPC ........................................................ 717/143
See application file for complete search history.

(56) References Cited

U.S. PATENT DOCUMENTS

| 4,706,212 | A | * | 11/1987 | Toma | ...................... | G06F 40/55 |
| | | | | | | 704/7 |
| 7,197,739 | B2 | * | 3/2007 | Preston | ................... | G06F 8/436 |
| | | | | | | 717/106 |
| 12,061,880 | B2 | * | 8/2024 | Chen | ..................... | G06F 40/284 |
| 2008/0307400 | A1 | * | 12/2008 | Dalal | .................... | G06F 40/284 |
| | | | | | | 717/142 |

(Continued)

OTHER PUBLICATIONS

Gatt, Albert, and Emiel Krahmer. "Survey of the state of the art in natural language generation: Core tasks, applications and evaluation." Journal of Artificial Intelligence Research 61 (2018): pp. 65-170. (Year: 2018).*

(Continued)

*Primary Examiner* — Satish Rampuria
(74) *Attorney, Agent, or Firm* — James J. DeCarlo; Greenberg Traurig, LLP

(57) ABSTRACT

Techniques for automatically generating a natural language (NL) translation of computer code are disclosed. In one embodiment, a computer-implemented method is disclosed comprising receiving, from a user, a code translation request in connection with code generated by a code generation system based on natural language (NL) input, analyzing the computer-generated code and generating a natural language (NL) translation of the computer-generated code based on the analysis, generating a graphical user interface (GUI) comprising the NL input, the NL translation of the computer-generated code and GUI control elements for receiving input from the user in connection with at least one of the NL input and the NL translation; causing the GUI to be displayed at a client device of the user, and receiving input from the user via at least one GUI control element and causing performance of at least one operation in response to the input.

20 Claims, 7 Drawing Sheets

(56)                    References Cited

U.S. PATENT DOCUMENTS

| | | | |
|---|---|---|---|
| 2013/0041651 A1* | 2/2013 | Dalal | G06F 40/284 |
| | | | 704/2 |
| 2014/0156282 A1* | 6/2014 | Madere | G06F 40/30 |
| | | | 704/275 |
| 2015/0161085 A1* | 6/2015 | Wolfram | G06F 40/143 |
| | | | 715/208 |
| 2024/0020116 A1* | 1/2024 | Chen | G06N 3/08 |

OTHER PUBLICATIONS

Bazaga, Adrián, Nupur Gunwant, and Gos Micklem. "Translating synthetic natural language to database queries with a polyglot deep learning framework." Scientific Reports 11.1 (2021): pp. 1-11. (Year: 2021).*

Kalita, Jugal. "Automatically generating natural language reports." International journal of man-machine studies 30.4 (1989): pp. 399-423. (Year: 1989).*

Bragg, Danielle, et al. "Sign language recognition, generation, and translation: An interdisciplinary perspective." Proceedings of the 21st international ACM SIGACCESS conference on computers and accessibility. 2019. pp. 16-31. (Year: 2019).*

Han, Sangmok, David R. Wallace, and Robert C. Miller. "Code completion of multiple keywords from abbreviated input." Automated Software Engineering 18.3 (2011): pp. 363-398. (Year: 2011).*

Soeken, Mathias, et al. "Automating the translation of assertions using natural language processing techniques." Proceedings of the 2014 Forum on Specification and Design Languages (FDL). vol. 978. IEEE, 2014. pp. 1-8. (Year: 2014).*

* cited by examiner

100

600

602
GENERATE GUI

604
RECEIVE NL INPUT

606
CAUSE CODE TO BE GENERATED
BASED ON RECEIVED NL INPUT

608
ANALYZE GENERATED CODE AND
GENERATE NL TRANSLATION
BASED ON THE ANALYSIS

610
UPDATE GUI

612
ANALYZE RECEIVED INPUT TO IDENTIFY ANY
NEEDED MODIFICATIONS

AUTOMATIC VALIDATION OF COMPUTER-GENERATED CODE METHOD AND APPARATUS

FIELD OF THE DISCLOSURE

The present disclosure relates to improvements to code generation systems and specifically to improvements in the verification of code generated by code generation systems.

BACKGROUND

Code generation systems that are based on natural language processing (NLP) and generative artificial intelligence (genAI) can take natural language as input and produce code based on the input as output. One example of a code generation system is a Structured Query Language (SQL) query generation system which takes a natural language query as input and outputs an SQL-formatted query as output. This enables users who are not experts in a programming language (e.g., SQL) to obtain code produced by the code-generation system by entering their query in natural language as input to the system. A problem arises when the code generated by the system is faulty, e.g., contains syntax errors, is not responsive to the user's input, etc. The user of a code generation system is typically inexperienced and is incapable of recognizing faulty output from the code generation system.

SUMMARY

The present disclosure addresses issues associated with the provides novel systems and methods for automatically generating a natural language (NL) translation of computer code, e.g., code automatically generated by a code generation system using a NL request.

Presently, code generation systems can use natural language processing (NLP) and generative artificial intelligence (genAI) to generate code based on a code generation request as input. The code generation request is typically in a natural language (NL) form. The code generation system uses the NL input to generate code as output based on the input. One example of a code generation system is a Structured Query Language (SQL) query generation system which takes an NL query as input and outputs an SQL-formatted query as output. A code generation system enables users who are not experts in a programming language (e.g., SQL) to obtain code produced by the code-generation system by submitting their code generation request (e.g., query) in a NL as input to the system.

A problem arises when the code generated by the system is faulty, e.g., contains syntax errors, is not responsive to the user's input, etc. The user of a code generation system is typically inexperienced and is incapable of recognizing faulty output from the code generation system. If the generated code includes a syntax error, the code is likely to end abnormally. Even if the generated code is free of syntax errors, the results from executing the code may not produce the results expected by the user. Unexpected results are likely due to the system's misinterpretation of the user's NL input. As such, there is a need for a mechanism to generate a NL translation of the code generation system and provide a user interface in which a user, even a novice user without computer programming skill, is enabled to check and provide further input that can be used to generate new or updated code.

In accordance with embodiments of the present application, disclosed systems and methods generate a natural language translation from output (e.g., code generated by NLP and genAI) of a code generation system, generate a graphical user interface (GUI) to display the NL translation and enable review and modification of the NL translation, a modified version of the NL translation, a suggested NL translation, etc. Modifications to the NL translation (or NL input used by the code generation system to generate the code) can be submitted to the code generation system to obtain updated computer-generated code. The NL translation enables improved review and comprehension of the computer-generated code by a user.

The GUI can comprise a display of the NL input used by the code generation system to produce the generated code as well as the NL translation of the generated code. The GUI can include controls for modifying the NL input from which the code was generated, the NL translation of the generated code or both. The GUI can include more than one NL translation of the code, each of which can be user-selectable and editable via control elements of the GUI. The disclosed systems and methods can provide suggested edits to the NL translation—e.g., suggested edit for all or some portion(s) of the NL translation. By way of a non-limiting example, a suggested edit can be provided in response to user selection of a portion of the NL translation. A suggested edit can be user selectable via the generated GUI. The disclosed systems and methods can modify the NL translation to include a suggested edit in response to user selection of the suggested edit.

The GUI can include a user-selectable control enabling the user to submit NL input to the code generation system. By way of a non-limiting example, the original NL input that is used by a code generation system to generate the code can be input by the user and submitted to the code generation system via the GUI. By way of some further non-limiting examples, the GUI can enable submission, to a computer generation system, of a modified version of the NL input, the NL translation, a modified version of the NL input, a modified version of the NL translation etc. The GUI can be updated based on the code generated by the code generation system.

The disclosed system and methods can include an update mechanism to learn from user input regarding the natural language translation. By way of a non-limiting example, the update mechanism can receive feedback and cause updates that can be used in subsequent natural language translations. By way of a non-limiting example, the update mechanism can receive feedback and forward the feedback to a code generation system for use by the code generation system in improving code generation from NL requests.

According to some embodiments, the disclosed systems and methods first receive a code generation translation request. By way of some non-limiting examples, the request can be received from a user or via a code generation system that generated code from NL user input. The request can comprise code generated by the code generation system or information that can be used to obtain the code generated by the code generation system. Additionally, the request can comprise the NL user input or information that can be used to obtain the NL user input.

The disclosed systems and methods can then analyze the generated code and generate a NL translation of the generated code based on the analysis. By way of a non-limiting example, the analysis can comprise parsing the generated code to identify constructs of the generated code that can be used with NL mappings to generate the NL translation for the code. By way of a further non-limiting example, each identified portion of the generated code can be used to generate a portion of the NL translation, multiple ones of the identified portions can be combined to generate some or all of the NL translation, etc.

By way of some non-limiting examples, the generated code can be based on a programming language, such as and without limitation SQL, Python®, Java®, JavaScript®, Hypertext Markup Language (HTML), etc., that has specific constructs (e.g., commands, tokens, phrases, variables, values, etc.) and syntax (e.g., rules or guidelines that define valid character sequences used in forming statements or expressions). In accordance with one or more embodiments, the generated code can be analyzed by parsing the code in accordance with the programming language's syntax to identify constructs of the programming language in the generated code. By way of a non-limiting example, constructs associated with the SQL programming language include SQL commands (e.g., select, update, delete, etc.) and database metadata (e.g., table names, field names, units for fields, display names for categorical values, etc.).

The disclosed systems and methods can then generate an NL translation of the generated code based on the analysis. In accordance with one or more embodiments, some or all of the constructs of the programming language can be mapped to, or otherwise associated with, an NL counterpart, or counterparts. By way of a non-limiting example, continuing with the SQL example, a table name in a database's metadata can be mapped to a natural language display version of the metadata.

The disclosed systems and methods can then generate a GUI comprising the generated NL translation. In accordance with embodiments of the present application, the GUI can display the NL translation of the generated code along with a number of GUI elements. The GUI can further include the NL input used to generate the code. The GUI can further include the generated code on which the generated NL translation is based, or provide a GUI control enabling display (e.g., a pop-up display) of the generated code. The GUI can be configured to enable edits to the generated code. The GUI can include results of processing the generated code—e.g., processing results received from a code processing system processing the generated code.

In accordance with one or more embodiments, the GUI can supply a warning, or warnings, indicating a potential issue, or issues, with the generated code. By way of a non-limiting example, the GUI can display a warning alerting the user of an issue spotted by the code processing system's analysis of the generated code prior to execution of the generated code, an execution-related issue or error that occurs during execution, etc. By way of a further non-limiting example, the warning displayed by the GUI can alert the user that the generated code could result in an infinite loop if executed. The warning can identify the portion, or portions, of the generated code as a likely cause of the infinite loop, or other issue. The warning can include suggested changes to address the warning, e.g., the infinite loop.

The GUI can display the NL translation in a field of the GUI that can display the NL translation and enable a user's edits to the displayed contents. A control element (e.g., a "Submit" button) corresponding to the display field can be user selectable to submit the displayed contents for processing. In the case of a NL translation, the disclosed systems and methods can cause the NL translation from the display field to be submitted to the code generation system to generate code in response to user selection of the "Submit"

control element. Similarly, the GUI can display the NL input (used by the code generation system to generate code used to generate the NL translation) in a display field enabled to receive user edits to the displayed contents. A corresponding control element (e.g., a "submit" button) can enable the user to submit the NL input displayed by the GUI to be submitted to the code generation system in connection with a request to generate code based on the displayed NL input.

In accordance with one or more embodiments, the disclosed systems and methods can provide suggested edits to the NL input, NL translation or generated code. The GUI can include more than one NL translation of the code, each of which is user-selectable and editable via controls of the UI. The disclosed systems and methods can provide suggested edits to the NL translation or some portion of the NL translation. By way of a non-limiting example, a suggested edit can be provided in response to user selection of a portion of the NL translation. The suggested edit can be user selectable via the generated UI. The disclosed systems and methods can modify the NL to include the suggested edit in response to user selection of the suggested edit.

The disclosed systems and methods can then use the user interaction with the UI as feedback to update the translation process. By way of some non-limiting example, the feedback can be used to make modifications and improvements to the code analysis and mappings, etc. By way of a further non-limiting example, the feedback can be used to make improvements to a code generation system—e.g., to use the feedback to make improvements to the code generation system's interpretation of NL input used in generating code.

The disclosed systems and methods generate a NL translation of generated code that can then be used for review prior to submission of the generated code to a system, e.g., an SQL Database Management System (DBMS), Python®, Java®, JavaScript®, Hypertext Markup Language (HTML), etc. system, for execution or other processing.

It will be recognized from the disclosure herein that embodiments of the instant disclosure provide improvements to a number of technology areas, for example those related to database management systems, application (e.g., web, mobile, gaming, etc.) development systems, Internet of things (IoT) technology, artificial intelligence, machine learning, search engines, code generation systems and the like. The disclosed systems and methods can effectuate increased speed, efficiency and accuracy in the ways that computer-executable code is generated, developed, designed, tested, reviewed, analyzed, adopted, etc., as the disclosed systems and methods, inter alia, provide NL translations of computer-executable code (e.g., computer-generated code, user-generated code, etc.) which can be used to review, comprehend and select a version of the computer-executable code to be executed or otherwise processed by a computing system, thus improving the quality of code submissions and focusing computing resources on processing code more likely to yield worthwhile results.

In accordance with one or more embodiments, a method is disclosed which includes receiving, at a computing device, from a user, a code translation request in connection with code generated by a code generation system based on natural language (NL) input; analyzing, via the computing device, the computer-generated code and generating a natural language (NL) translation of the computer-generated code based on the analysis; generating, via the computing device, a graphical user interface (GUI) comprising the NL input, the NL translation of the computer-generated code and GUI control elements for receiving input from the user in connection with at least one of the NL input and the NL translation; causing, via the computing device, the GUI to be displayed at a client device of the user; and receiving, at the computing device, input from the user via at least one GUI control element and causing performance of at least one operation in response to the input.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically generating a natural language (NL) translation of computer code.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

Figure 5:
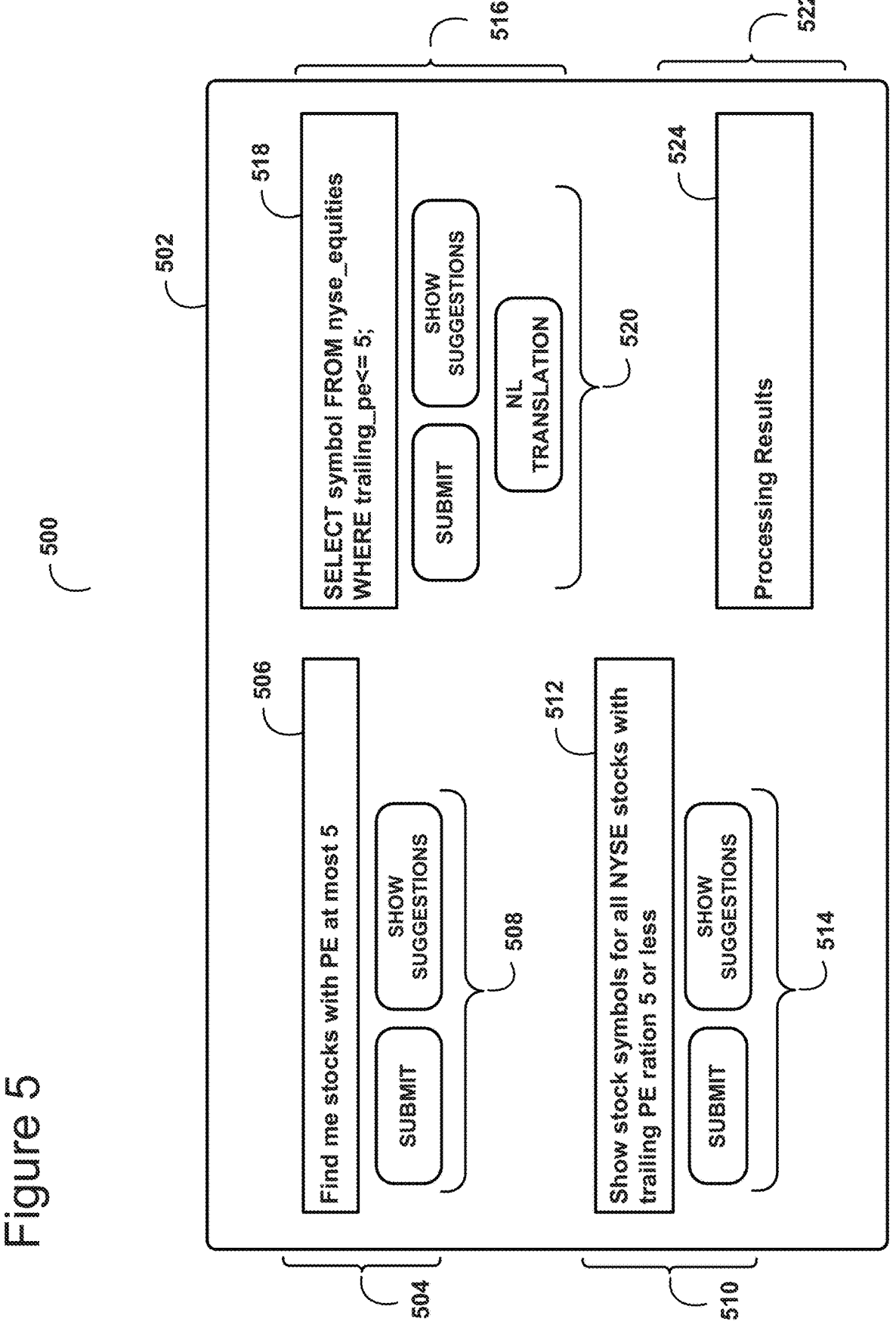
Figure 6:
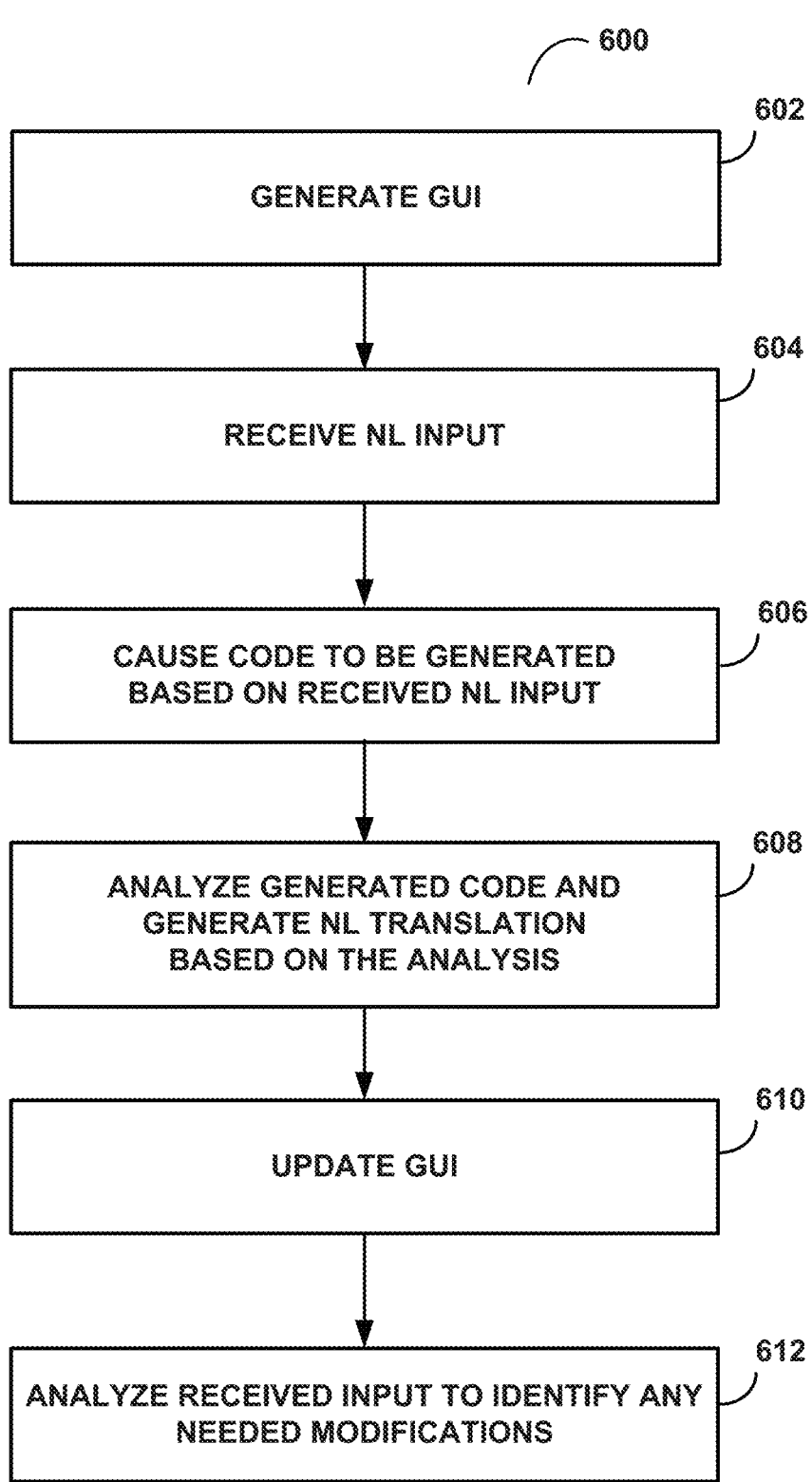
Figure 7:
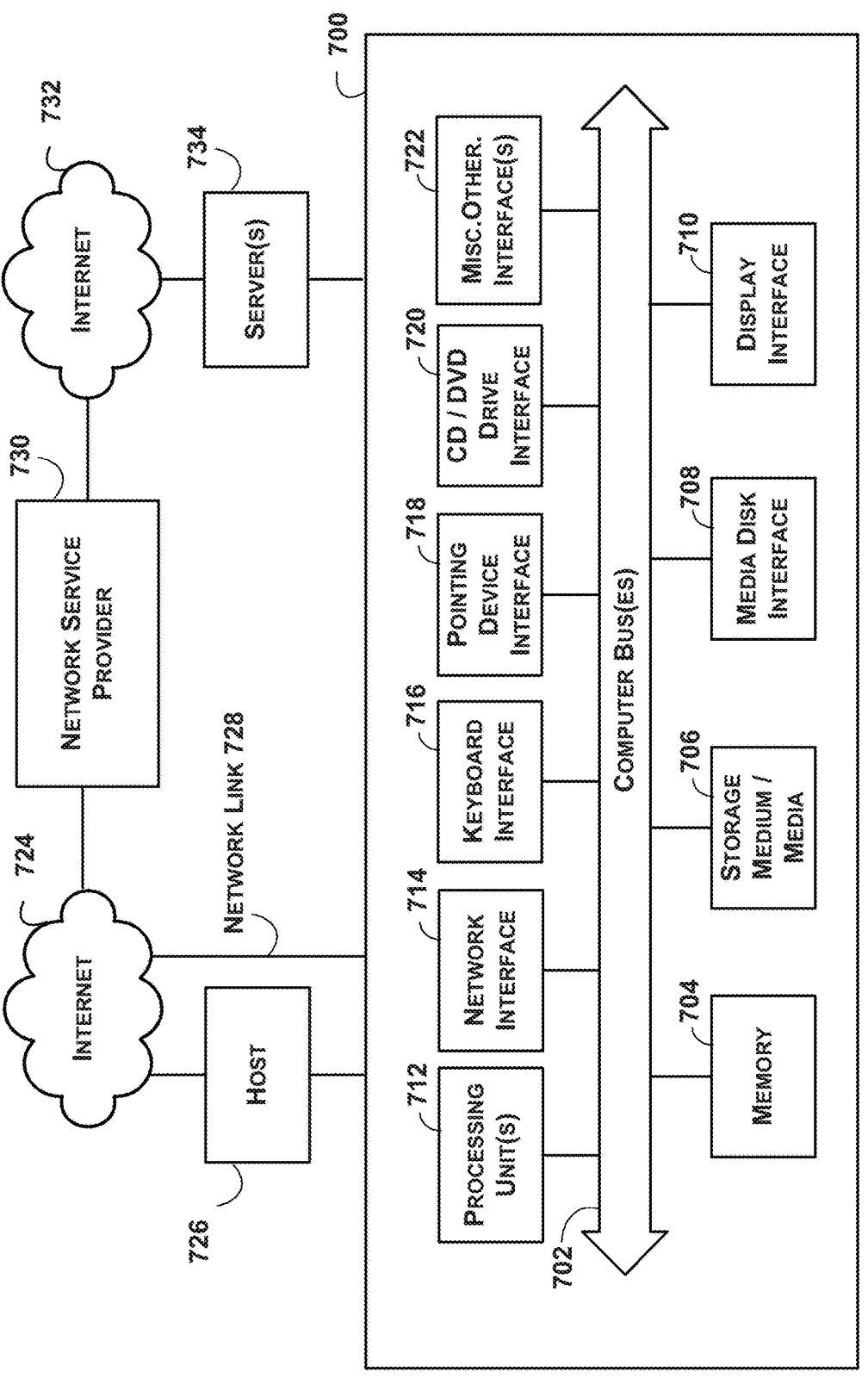

FIG. 5 provides an exemplary example of a GUI including a NL translation in accordance with one or more embodiments of the present disclosure;

FIG. 6 is a flowchart illustrating steps performed in accordance with some embodiments of the present disclosure; and FIG. 7 is a block diagram illustrating the architecture of an exemplary hardware device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, online service providers can provide service to an entity (e.g., end users, other service providers, etc.) that communicates a request for service to the service provider via an electronic communications network, such as the internet. The search request can be a search request, a recommendation request, an ecommerce request, a content request, etc.

Presently, code generation systems can use natural language processing (NLP) and generative artificial intelligence (genAI) to generate code based on a code generation request as input. The code generation request is typically in a natural language (NL) form. The code generation system uses the NL input to generate code as output based on the input. One example of a code generation system is a Structured Query Language (SQL) query generation system which takes an NL query as input and outputs an SQL-formatted query as output. A code generation system enables users who are not experts in a programming language (e.g., SQL) to obtain code produced by the code-generation system by submitting their code generation request (e.g., query) in a NL as input to the system.

A problem arises when the code generated by the system is faulty, e.g., contains syntax errors, is not responsive to the user's input, etc. The user of a code generation system is typically inexperienced and is incapable of recognizing faulty output from the code generation system. If the generated code includes a syntax error, the code is likely to end abnormally. Even if the generated code is free of syntax errors, the results from executing the code may not produce the results expected by the user. Unexpected results are likely due to the system's misinterpretation of the user's NL input. As such, there is a need for a mechanism to generate a NL translation of the code generation system and provide a user interface in which a user, even a novice user without computer programming skill, is enabled to check and provide further input that can be used to generate new or updated code.

In accordance with embodiments of the present application, disclosed systems and methods generate a natural language translation from output (e.g., code generated by NLP and genAI) of a code generation system, generate a graphical user interface (GUI) to display the NL translation and enable review and modification of the NL translation, a modified version of the NL translation, a suggested NL translation, etc. Modifications to the NL translation (or NL input used by the code generation system to generate the code) can be submitted to the code generation system to obtain updated computer-generated code. The NL translation enables improved review and comprehension of the computer-generated code by a user.

The GUI can comprise a display of the NL input used by the code generation system to produce the generated code as well as the NL translation of the generated code. The GUI can include controls for modifying the NL input from which the code was generated, the NL translation of the generated code or both. The GUI can include more than one NL translation of the code, each of which can be user-selectable and editable via control elements of the GUI. The disclosed systems and methods can provide suggested edits to the NL translation—e.g., suggested edit for all or some portion(s) of the NL translation. By way of a non-limiting example, a suggested edit can be provided in response to user selection of a portion of the NL translation. A suggested edit can be user selectable via the generated GUI. The disclosed systems and methods can modify the NL translation to include a suggested edit in response to user selection of the suggested edit.

The GUI can include a user-selectable control enabling the user to submit NL input to the code generation system. By way of a non-limiting example, the original NL input that is used by a code generation system to generate the code can be input by the user and submitted to the code generation system via the GUI. By way of some further non-limiting examples, the GUI can enable submission, to a computer generation system, of a modified version of the NL input, the NL translation, a modified version of the NL input, a modified version of the NL translation etc. The GUI can be updated based on the code generated by the code generation system.

The disclosed system and methods can include an update mechanism to learn from user input regarding the natural language translation. By way of a non-limiting example, the update mechanism can receive feedback and cause updates that can be used in subsequent natural language translations. By way of a non-limiting example, the update mechanism can receive feedback and forward the feedback to a code generation system for use by the code generation system in improving code generation from NL requests.

According to some embodiments, the disclosed systems and methods first receive a code generation translation request. By way of some non-limiting examples, the request can be received from a user or via a code generation system that generated code from NL user input. The request can comprise code generated by the code generation system or information that can be used to obtain the code generated by the code generation system. Additionally, the request can comprise the NL user input or information that can be used to obtain the NL user input.

The disclosed systems and methods can then analyze the generated code and generate a NL translation of the generated code based on the analysis. By way of a non-limiting example, the analysis can comprise parsing the generated code to identify constructs of the generated code that can be used with NL mappings to generate the NL translation for the code. By way of a further non-limiting example, each identified portion of the generated code can be used to generate a portion of the NL translation, multiple ones of the identified portions can be combined to generate some or all of the NL translation, etc.

By way of some non-limiting examples, the generated code can be based on a programming language, such as and without limitation SQL, Python®, Java®, JavaScript®, Hypertext Markup Language (HTML), etc., that has specific constructs (e.g., commands, tokens, phrases, variables, values, etc.) and syntax (e.g., rules or guidelines that define valid character sequences used in forming statements or expressions). In accordance with one or more embodiments, the generated code can be analyzed by parsing the code in accordance with the programming language's syntax to identify constructs of the programming language in the generated code. By way of a non-limiting example, constructs associated with the SQL programming language include SQL commands (e.g., select, update, delete, etc.) and database metadata (e.g., table names, field names, units for fields, display names for categorical values, etc.).

The disclosed systems and methods can then generate an NL translation of the generated code based on the analysis. In accordance with one or more embodiments, some or all of the constructs of the programming language can be mapped to, or otherwise associated with, an NL counterpart, or counterparts. By way of a non-limiting example, continuing with the SQL example, a table name in a database's metadata can be mapped to a natural language display version of the metadata.

The disclosed systems and methods can then generate a GUI comprising the generated NL translation. In accordance with embodiments of the present application, the GUI can display the NL translation of the generated code along with a number of GUI elements. The GUI can further include the NL input used to generate the code. The GUI can further include the generated code on which the generated NL translation is based, or provide a GUI control enabling display (e.g., a pop-up display) of the generated code. The GUI can be configured to enable edits to the generated code. The GUI can include results of processing the generated code—e.g., processing results received from a code processing system processing the generated code.

In accordance with one or more embodiments, the GUI can supply a warning, or warnings, indicating a potential issue, or issues, with the generated code. By way of a non-limiting example, the GUI can display a warning alerting the user of an issue spotted by the code processing system's analysis of the generated code prior to execution of the generated code, an execution-related issue or error that occurs during execution, etc. By way of a further non-limiting example, the warning displayed by the GUI can alert the user that the generated code could result in an infinite loop if executed. The warning can identify the portion, or portions, of the generated code as a likely cause of the infinite loop, or other issue. The warning can include suggested changes to address the warning, e.g., the infinite loop.

The GUI can display the NL translation in a field of the GUI that can display the NL translation and enable a user's edits to the displayed contents. A control element (e.g., a "Submit" button) corresponding to the display field can be user selectable to submit the displayed contents for processing. In the case of a NL translation, the disclosed systems and methods can cause the NL translation from the display field to be submitted to the code generation system to generate code in response to user selection of the "Submit" control element. Similarly, the GUI can display the NL input (used by the code generation system to generate code used to generate the NL translation) in a display field enabled to receive user edits to the displayed contents. A corresponding control element (e.g., a "submit" button) can enable the user to submit the NL input displayed by the GUI to be submitted to the code generation system in connection with a request to generate code based on the displayed NL input.

In accordance with one or more embodiments, the disclosed systems and methods can provide suggested edits to the NL input, NL translation or generated code. The GUI can include more than one NL translation of the code, each of which is user-selectable and editable via controls of the UI. The disclosed systems and methods can provide suggested edits to the NL translation or some portion of the NL translation. By way of a non-limiting example, a suggested edit can be provided in response to user selection of a portion of the NL translation. The suggested edit can be user selectable via the generated UI. The disclosed systems and methods can modify the NL to include the suggested edit in response to user selection of the suggested edit.

The disclosed systems and methods can then use the user interaction with the UI as feedback to update the translation process. By way of some non-limiting example, the feedback can be used to make modifications and improvements to the code analysis and mappings, etc. By way of a further non-limiting example, the feedback can be used to make improvements to a code generation system—e.g., to use the feedback to make improvements to the code generation system's interpretation of NL input used in generating code.

The disclosed systems and methods generate a NL translation of generated code that can then be used for review prior to submission of the generated code to a system, e.g., an SQL Database Management System (DBMS), Python®, Java®, JavaScript®, Hypertext Markup Language (HTML), etc. system, for execution or other processing.

It will be recognized from the disclosure herein that embodiments of the instant disclosure provide improvements to a number of technology areas, for example those related to database management systems, application (e.g., web, mobile, gaming, etc.) development systems, Internet of things (IoT) technology, artificial intelligence, machine learning, search engines, code generation systems and the like. The disclosed systems and methods can effectuate increased speed, efficiency and accuracy in the ways that computer-executable code is generated, developed, designed, tested, reviewed, analyzed, adopted, etc., as the disclosed systems and methods, inter alia, provide NL translations of computer-executable code (e.g., computer-generated code, user-generated code, etc.) which can be used to review, comprehend and select a version of the computer-executable code to be executed or otherwise processed by a computing system, thus improving the quality of code submissions and focusing computing resources on processing code more likely to yield worthwhile results.

Figure 1:
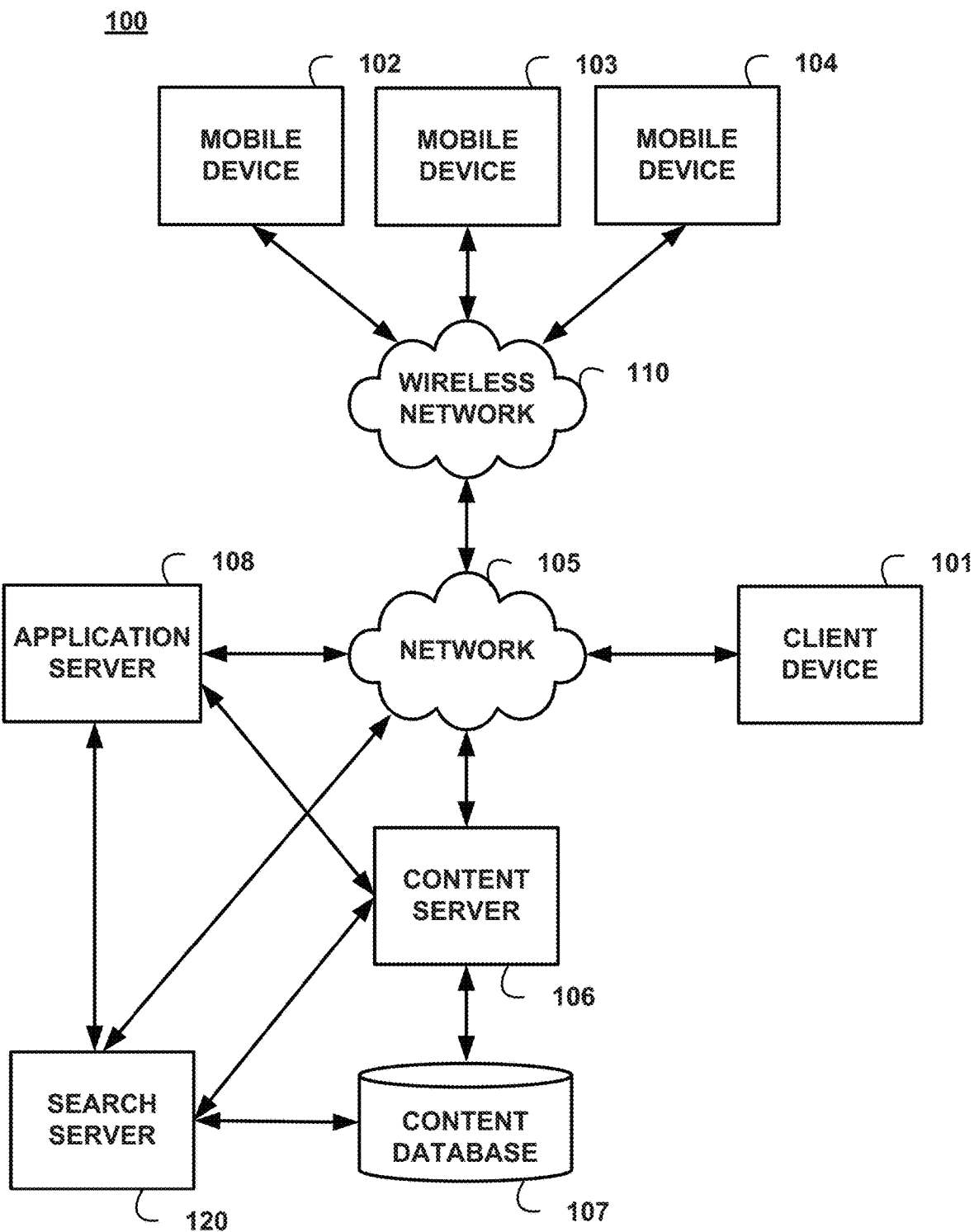
FIG. 1 is a schematic diagram illustrating an example of a network within which the systems and methods disclosed herein could be implemented according to some embodiments of the present disclosure.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, by way of non-limiting examples, content server 106, application (or "App") server 108, search server 120 and advertising ("ad") server (not shown).

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Devices 101-104 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include Ipv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communicate with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation.

Where advertising analytics transmittal is not immediately available, gathered advertising analytics may be stored by an advertising presentation system until transmittal of those advertising analytics becomes available.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120, or an ad server or ad network.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
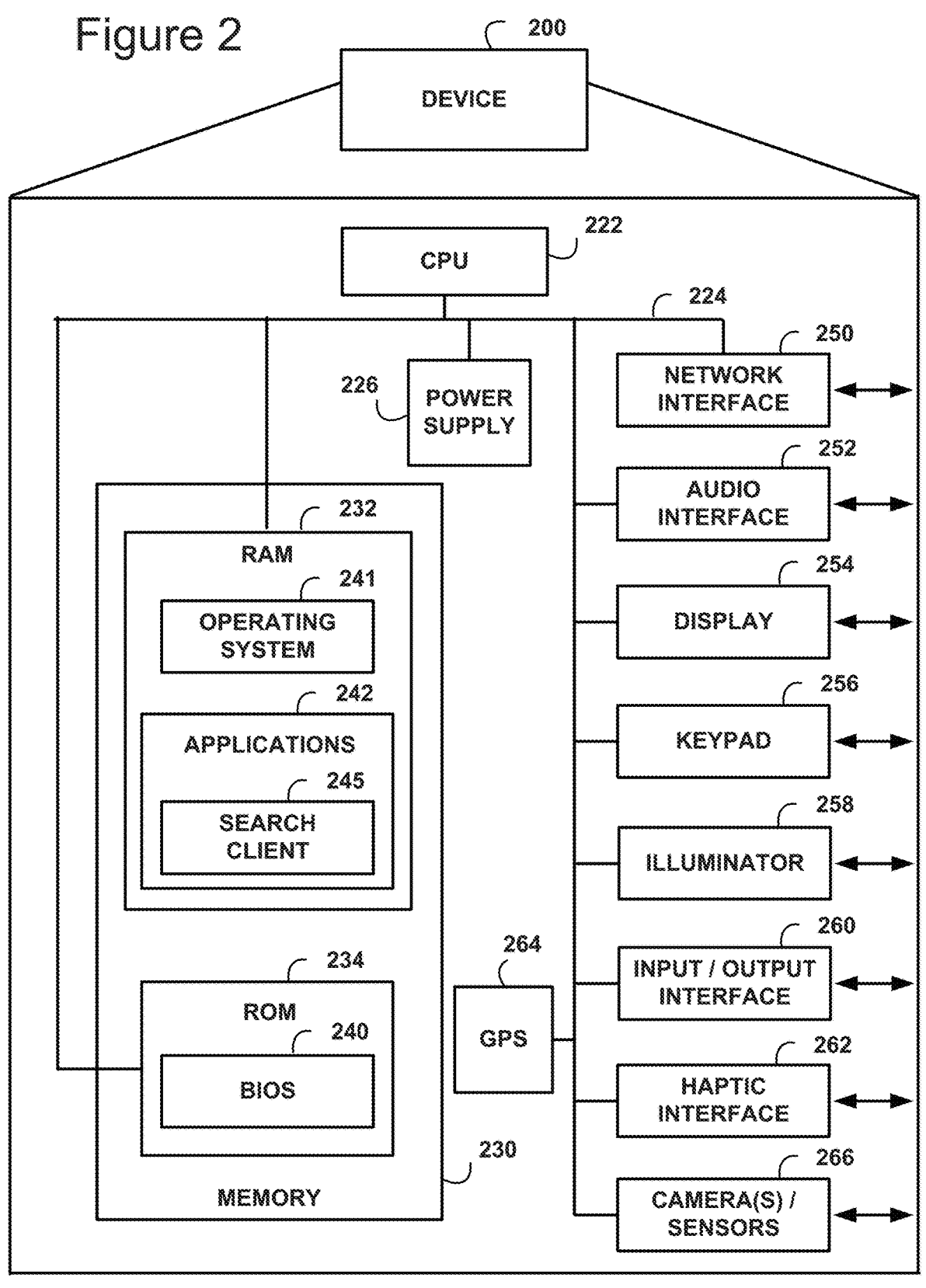
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Device 200 may include many more or less components than those shown in FIG. 2. However, the components shown are sufficient to disclose an illustrative embodiment for implementing the present disclosure. Device 200 may represent, for example, client device 101 and mobile devices 102-104 discussed above in relation to FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Device 200 may optionally communicate with a base station (not shown), or directly with another computing device. Network interface 250 includes circuitry for coupling device 200 to one or more networks, and is constructed for use with one or more communication protocols and technologies as discussed above.

Optional GPS transceiver 264 can determine the physical coordinates of device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of device 200 on the surface of the Earth. In an embodiment, device 200 may, through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of device 200. The mass memory also stores an operating system 241 for controlling the operation of device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by device 200 to store, among other things, applications 242 and/or other data. For example, data stores may be employed to store information that describes various capabilities of device 200. The information may then be provided to another device based on any of a variety of events, including being sent as part of a header during a communication, sent upon request, or the like. At least a portion of the capability information may also be stored on a disk drive or other storage medium (not shown) within device 200.

Applications 242 may include computer executable instructions which, when executed by device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
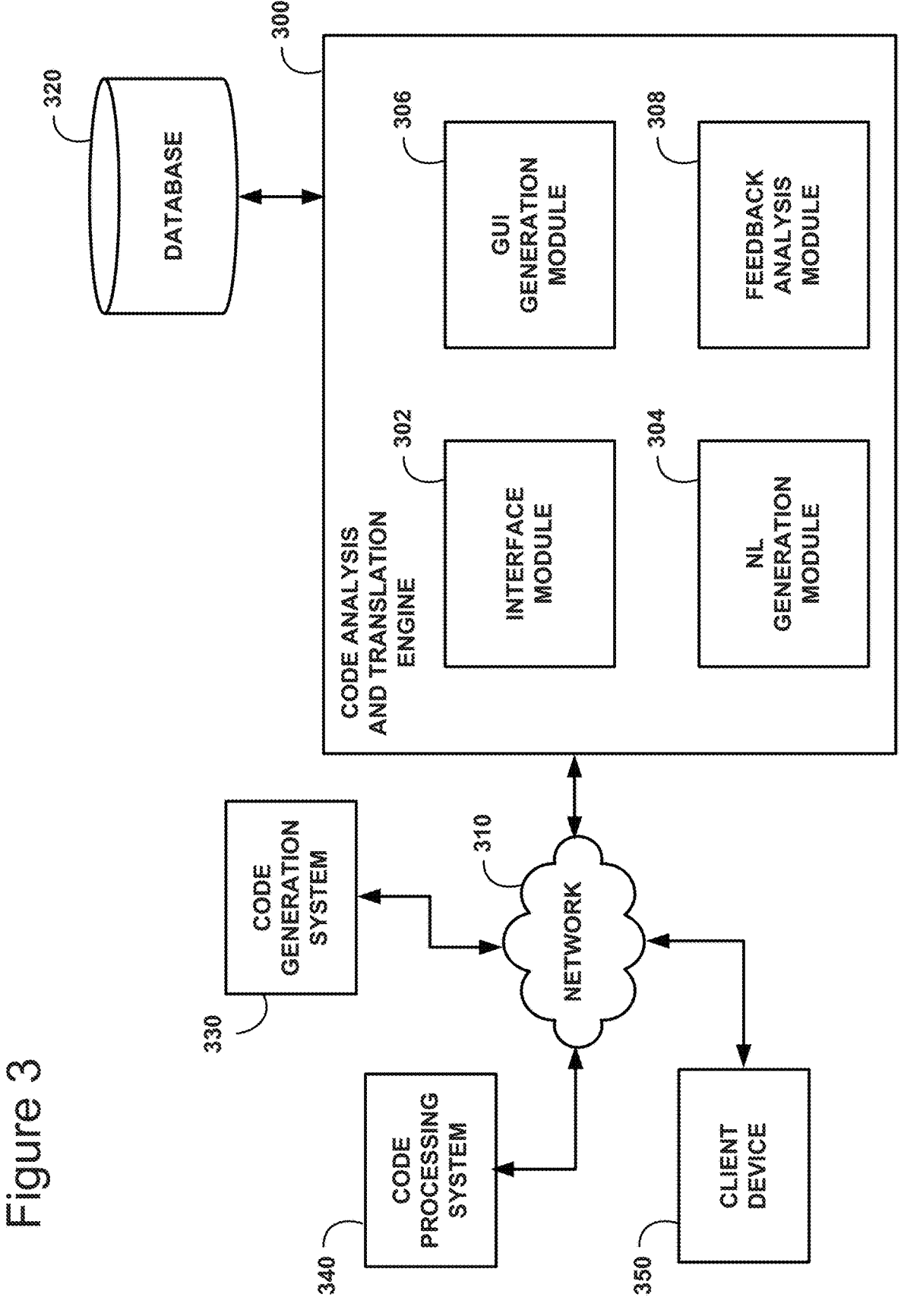
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a code analysis and translation engine 300, network 310 and database 320. In the example shown in FIG. 3, engine 300 can be communicatively coupled to a code generation system 330, a code processing system 340 and/or a client device 350.

Engine 300 can be a special purpose machine or processor and could be hosted by a stand-alone computing device or a computing device of a service provider, such as and without limitation an application server, content server, social networking server, web server, search server, content provider, email service provider, ad server, and the like, or any combination thereof.

According to some embodiments, engine 300 can be embodied as a stand-alone application that operates in conjunction with an application that receives and processes service requests. Engine 300 can be used to generate an NL translation of code generated by code generation system 330. In some embodiments, engine 300 can be incorporated into a system, such as and without limitation code generation system 330, code processing system 340, client device 350, etc. In some embodiments, some portion, or portions, of engine 300 can be embodied as a standalone application while another portions, or portions can be embodied in another application.

The database 320 can be any type of database or memory, and can be associated with a server on a network (such as and without limitation a content server, search server, application server, etc.,). Database 320 comprises a dataset of data and metadata associated with local and/or network information related to translation of code, such as code generated by code generation system 330. Such information can include programming language definitional information, such as and without limitation programming constructs, syntax, etc., that can be used by engine 300 to analyze the generated code and generate an NL translation of the generated code. Such information can be stored and indexed in the database 320 independently and/or as a linked or associated dataset. It should be understood that the data (and metadata) in the database 320 can be any type of information and type, whether known or to be known, without departing from the scope of the present disclosure.

The network 310 can be any type of network such as, but not limited to, a wireless network, a local area network (LAN), wide area network (WAN), the Internet, or a combination thereof. The network 310 facilitates connectivity of engine 300, and the database of stored resources 320. Indeed, as illustrated in FIG. 3, engine 300 and database 320 can be directly connected by any known or to be known method of connecting and/or enabling communication between such devices and resources. In accordance with one or more embodiments, network 310 can facilitate connectivity of engine 300, code generation system 330, code processing system 340 and/or client device 350.

The principal processor, server, or combination of devices that comprises hardware programmed in accordance with the special purpose functions herein is referred to for convenience as engine 300, and includes interface module 302, NL generation module 304, GUI generation module 306, and feedback analysis module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the engine 300 can be supplied to the database 320 in order to ensure that the information housed in the database 320 is up-to-date as the disclosed systems and methods leverage real-time information being processed by engine 300, as discussed in more detail below.

Figure 4:
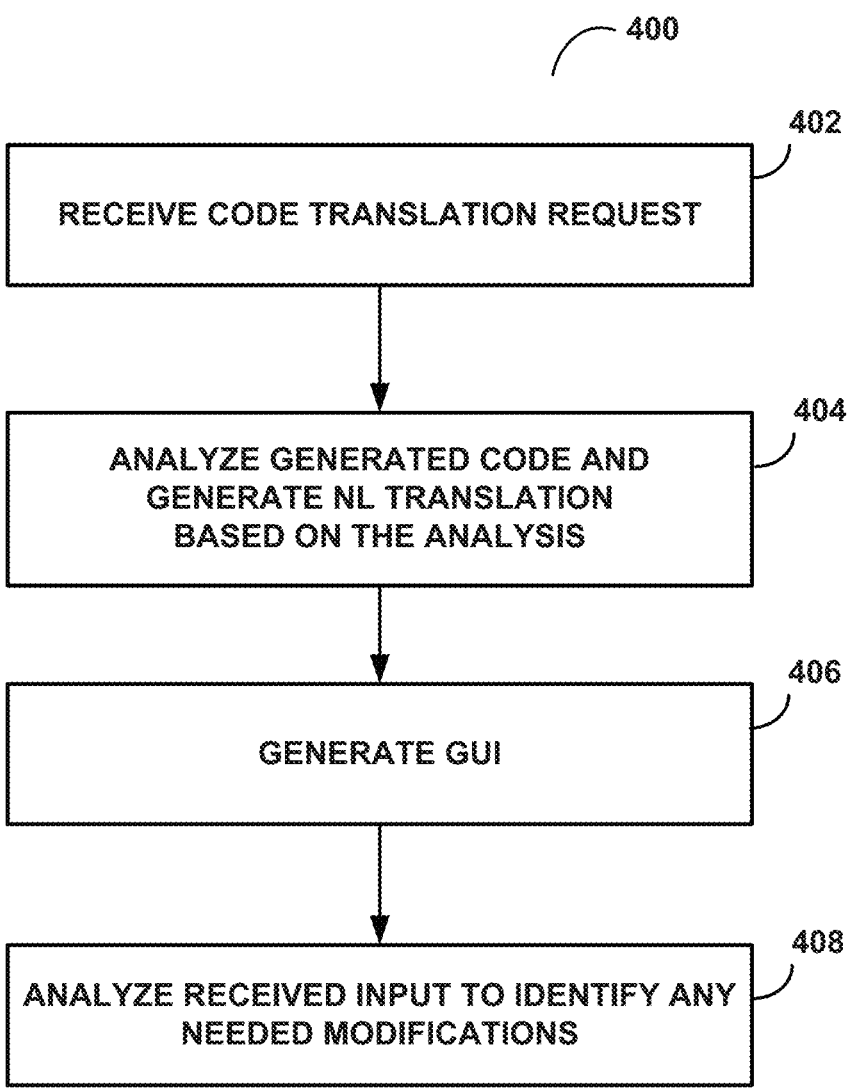
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatically generating a NL translation of code (e.g., code generated by code generation system 330 from NL input). According to some embodiments, as discussed herein with relation to FIG. 4, the process involves analyzing generated code, such as that generated by code generation system 330, and automatically generating at least one NL translation of the generated code based on the analysis. The process further involves generating a GUI comprising at least one NL translation for display to a user (e.g., via client device 350) and enable the user's review and modification of the NL translation, NL input, etc. The GUI can further comprise the NL input used by the code generation system 330 to generate the code. In addition, the GUI can display the generated code, suggested edits to the NL input, the NL translation, etc. The process can further involve analyzing user input to identify any updates that can improve the process. The process can further involve forwarding feedback to the code generation system 330, which can use the feedback to make improvements in generating code based on NL code generation requests.

At step 402, which can be performed by module 302 of engine 300, a code translation request can be received. By way of some non-limiting examples, the request can be received from a user via client device 350, code generation system 330, code processing system 340, etc. The request can comprise code generated by code generation system 330 or information that can be used to obtain the code generated by the code generation system 330. Additionally, the request can comprise the NL input used by code generation system 330 to generate the code.

At step 404, which can be performed by module 304, the generated code can be analyzed, and a NL translation can be generated based on the analysis. By way of a non-limiting example, the analysis can comprise parsing the generated code to identify constructs of the generated code that can be used to generate the NL translation for the code. By way of a further non-limiting example, each identified portion of the generated code can be used to generate a portion of the NL translation, multiple ones of the identified portions can be combined to generate some or all of the NL translation, etc.

By way of some non-limiting examples, the generated code can be based on a programming language, such as and without limitation SQL, Python®, Java®, JavaScript®, Hypertext Markup Language (HTML), etc., that has specific constructs (e.g., commands, tokens, phrases, variables, values, etc.) and syntax (e.g., rules or guidelines that define valid character sequences used in forming statements or expressions).

In accordance with one or more embodiments, the generated code can be analyzed by parsing the code in accordance with the programming language's syntax to identify constructs of the programming language in the generated code. By way of a non-limiting example, constructs associated with the SQL programming language include SQL commands (e.g., select, update, delete, etc.) and database metadata (e.g., table names, field names, units for fields, display names for categorical values, etc.).

The disclosed systems and methods can then generate a NL translation of the generated code based on the analysis. In accordance with one or more embodiments, some or all of the constructs of the programming language can be mapped to, or otherwise associated with, a NL counterpart, or counterparts. By way of a non-limiting example, continuing with the SQL example, a table name in a database's metadata can be mapped to a NL display-version of the metadata.

At step 406, which can be performed by GUI generation module 306, a GUI can be generated to display the generated NL translation (e.g., at client device 350). In accordance with embodiments of the present application, the GUI can display the NL translation of the generated code along with a number of GUI control elements. The GUI can further include the NL input used to generate the code. The GUI can further include the generated code on which the generated NL translation is based, or provide a GUI control enabling display (e.g., a pop-up display) of the generated code. The GUI can be configured to enable edits to the NL input, NL translation and/or the generated code.

FIG. 5 provides an exemplary example of a GUI including a NL translation in accordance with one or more embodiments of the present disclosure. In example 500 of FIG. 5, GUI 502 includes a number of areas, such as and without limitation NL input display area 504, NL translation display area 510, generated code display area 516 and a processing results display area 522. Any one or more of these areas can be included in GUI 502. While example 502 shows the areas being displayed in a single display (e.g., window), it should be apparent that multiple displays (e.g., windows, popup display, etc.) can be used to display one or more of the areas.

In example 500, GUI 502 can display the NL translation generated at step 404 in a field (e.g., field 512) of the GUI. By way of a non-limiting example, field 512 can display the NL translation and enable receiving a user's edits to the displayed contents. In accordance with one or more embodiments, a number of GUI control elements 514 can be associated with field 512. GUI control elements 514 can include a control element (e.g., "Submit" button) corresponding to the display field that can be user selectable. Engine 300 can receive a user's submission request via the control element. In the case of the NL translation, engine 300 (e.g., via interface module 302 and network 310) can cause the contents of field 512 to be submitted to the code generation system 330 to generate code in response to user selection of the control element.

By way of a non-limiting example, interface module 302 can submit the contents of field 512 to code generation system 330 as a request for the code generation system 330 to generate code based on the contents of field 512. Interface module 302 can receive generated code in response, NL generation module 304 can generate a NL translation of the received code and GUI generation module 306 can generate, or update, GUI 502 in response. By way of a further non-limiting example, field 506 can be updated to reflect the previous contents of field 512, field 518 can be updated to display the code generated by code generation system 330 based on the previous contents of field 512 and field 512 can be updated to display the NL translation generated by module 304 based on the code displayed in field 518.

In example 500, GUI control elements 514 associated with field 512 can include a control element (e.g., "Show Suggestions" button) that can be user selectable. Engine 300 can receive a user's request for a suggestion, or suggestions, via the control element. By way a non-limiting example, the suggestion(s) can correspond to a portion of the contents of field 512 (e.g., a user-selected portion) or the entire contents of field 512. By way of a further non-limiting example, the user can select all of some portion of the contents of field 512 and select the control element to request suggested edits for the selected contents.

As shown in example 500, in accordance with one or more embodiments, GUI 500 can include the NL input (used by the code generation system to generate the code used to generate the NL translation) in field 506. Field 506 can be enabled to receive user edits to the contents of field 506.

In accordance with one or more embodiments, a number of GUI control elements 508 can be associated with field 506. The GUI control elements 508 can include a control element (e.g., "Submit" button) corresponding to field 506 that can be user selectable. By way of a non-limiting example, the user can edit the contents of field 506 and then use the "Submit" control element to request that code be generated based on the edited contents of field 506. Engine 300 can receive a user's submit request via the control element. In the case of the NL input field 506, engine 300 (e.g., via interface module 302 and network 310) can cause the contents of field 506 to be submitted to the code generation system 330 to generate code in response to user selection of the "Submit" control element.

As discussed above in connection with NL translation display field 512, the interface module 302 can respond to the submit request by forwarding a request to the code generation system 330 to generate code based on the contents of field 506 and GUI 502 can be updated in a manner similar to that discussed above in connection with a submission request associated with NL translation display field 512. By way of a further non-limiting example, field 506 can be updated to reflect the submitted contents of field 506, field 518 can be updated to display the code generated by code generation system 330 based on the submitted contents of field 506 and field 512 can be updated to display a NL translation generated by module 304 based on the code displayed in field 518.

In example 500, control elements 508 associated with field 506 can include a control element (e.g., "Show Suggestions" button) that can be user selectable. Engine 300 can receive a user's request for a suggestion, or suggestions, via the control element. By way a non-limiting example, the suggestion(s) can correspond to a portion of the contents of field 506 (e.g., a user-selected portion) or the entire contents of field 506. By way of a further non-limiting example, the user can select all of some portion of the contents of field 506 and select the control element to request suggested edits for the selected contents.

As shown in example 500, in accordance with one or more embodiments, GUI 500 can include the code generated by code generation system 330 based on a NL request (e.g., the NL input displayed in field 506, the NL translation displayed in field 512, etc.). Field 518 can be enabled to receive user edits to the contents of field 518.

In accordance with one or more embodiments, a number of controls 520 can be associated with field 518. The controls 520 can include a control element (e.g., "Submit"

button) corresponding to field 518 that can be user selectable. By way of a non-limiting example, the user can use a "Submit" control element to request that the contents of field 518 be submitted to code processing system 340. Engine 300 can receive a user's submit request via the control element. In the case of the code display field 518, engine 300 (e.g., via interface module 302 and network 310) can cause the contents of field 518 to be submitted to the code processing system 340 to cause code processing system 340 to process (e.g., execute, analyze, etc.) the code displayed in field 518 in response to user selection of the control element.

In accordance with one or more embodiments, processing results generated by code processing system 340 can be displayed in processing results display field 524 of GUI 502. By way of a non-limiting example, interface module 302 can respond to the submit request by forwarding (e.g., via interface module 302 and network 310) a request to the code processing system 340 to generate processing results (e.g., results of processing, code analysis, etc.) based on the contents of field 518. Interface module 302 can receive (e.g., via interface module 302 and network 310) the processing results from code processing system 340 and GUI generation module 306 can update GUI 502 to display the processing results received from code processing system 340.

In accordance with one or more embodiments, display field 524 of GUI 502 can supply a warning, or warnings, indicating a potential issue, or issues, with the generated code displayed in field 518. By way of a non-limiting example, display field 524 of GUI 502 can display a warning alerting the user of an issue spotted by code processing system 340 in analyzing the generated code prior to execution of the generated code. By way of another non-limiting example, display field 524 of GUI 502 can display an execution-related issue or error, etc. encountered by code processing system 340 attempting to execute the generated code. By way of a further non-limiting example, the warning displayed by the GUI can alert the user that the generated code could result in an infinite loop if executed. The warning can identify the portion, or portions, of the generated code as a likely cause of the infinite loop, or other issue. The warning can include suggested changes to address the warning, e.g., the infinite loop.

In example 500, GUI control elements 520 associated with field 518 can include a control element (e.g., "Show Suggestions" button) that can be user selectable. Engine 300 can receive a user's request for a suggestion, or suggestions, via the control element. By way a non-limiting example, the suggestion(s) can correspond to a portion of the contents of field 518 (e.g., a user-selected portion) or the entire contents of field 518.

In accordance with one or more embodiments, GUI control elements 520 can include a control element (e.g., "NL Translation" button) corresponding to field 518 that can be user selectable to request a NL translation of the contents of field 518. By way of a non-limiting example, the user can edit the contents of field 518 and then use a "NL Translation" control element to request that a NL translation be generated based on the contents of field. Engine 300 can receive a user's request via the control element. In accordance with one or more embodiments of the present disclosure, in response to the user request, NL generation module 304 can generate a NL translation based on the contents of display field 518 and GUI generation module 306 can update GUI 502 to display the NL translation generated by NL generation module 304 in field 512 of GUI 502.

In accordance with one or more embodiments, disclosed embodiments can provide suggested edits to the NL input, NL translation or generated code. The GUI can include more than one NL translation of the code, each of which is user-selectable and editable via controls of the UI. The disclosed embodiments can provide suggested edits to the NL translation or some portion of the NL translation. By way of a non-limiting example, a suggested edit can be provided in response to user selection of a portion of the NL translation. The suggested edit can be user selectable via the generated UI. The disclosed embodiments can modify the NL to include the suggested edit in response to user selection of the suggested edit.

The disclosed systems and methods can be used to review and accept a version of the generated code that can be submitted to a system, e.g., an SQL Database Management System (DBMS), Python®, Java®, JavaScript®, Hypertext Markup Language (HTML), etc. system, for processing (e.g., execution, analysis, etc.).

Referring again to FIG. 4, at step 408 (which can be performed by feedback analysis module 308), feedback received by engine 300 can be analyzed and changes to engine 300 can be made to engine 300 based on the analysis. By way of another non-limiting example, engine 300 can then use feedback (e.g., the user interaction with the UI) to update the process. By way of some non-limiting example, the feedback can be used to make modifications and improvements to the code analysis and mappings, etc. By way of another non-limiting example, user feedback in the form of user selection (or lack of selection) of a suggestion can be used by NL generation module 304 in the identification, prioritization, etc. of suggestions to be presented to the user via a GUI generated by GUI generation module 306. By way of yet another non-limiting example, feedback can be forwarded to other systems, such as code generation system 330—e.g., code generation system 330 can use the feedback to improve code generation based on NL request input.

FIG. 6 is a flowchart illustrating steps performed in accordance with some embodiments of the present disclosure. In process 600, steps 608 and 612 correspond to steps 404 and 408 (respectively) of process 400 of FIG. 4. Process 600 differs from process 400 in that a GUI (e.g., GUI 502 shown in example 500 of FIG. 5) can be generated by GUI generation prior to NL generation module 304 generating a NL translation. In process 600, GUI can be generated and used to receive NL input that can be used (e.g., by code generation system 330) to generate code, which can then be used by NL generation module 304 to generate a NL translation. In addition, in process 600, the generated code and NL translation can be used to update the GUI.

At step 602, which can be performed by GUI generation module 306, a GUI can be generated for display (e.g., at client device 350). By way of a non-limiting example, the GUI can include at least display area, such as display area 504 shown in example 500 of FIG. 5. Field 506 can initially be empty and awaiting input from the user. Display area 510, 516 and 522 can, but need not be, displayed in GUI 502 at this stage (e.g., prior to receiving NL input).

At step 604, which can be performed by GUI generation module 306, field 506 of GUI 502 can be used to receive NL input from the user. A control element (e.g., "Show Suggestions") can be selected by the user to request suggestions for completing and/or modifying the contents of field 506. Engine 300 can receive a user's request for a suggestion, or suggestions, via the control element. By way a non-limiting example, the suggestion(s) can correspond to a portion of the contents of field 512 (e.g., a user-selected portion) or the entire contents of field 512.

A control element (e.g., the "Submit" button) from GUI control elements 508 can be used to receive user input requesting that code be generated based on the contents of field 506. By way of a non-limiting example, the user can enter NL input in field 506, modify the contents of field 506, request suggestions based on the contents of field 506, etc., and then use the "Submit" control element to request that code be generated based on the contents of field 506. Engine 300 (e.g., via GUI generation module 306) can receive a user's submit request via the "Submit" control element.

At step 606, which can be performed by interface module 302, engine 300 (e.g., via interface module 302 and network 310) can cause the contents of field 506 to be submitted (e.g., via a code generation request) to the code generation system 330 to generate code in response to user selection of the "Submit" control element. Interface module 302 can receive generated code in response.

Step 608 and 612 can be performed in a manner similar to that described in connection with step 404 of process 400 shown in FIG. 4.

At step 610, GUI 502 can be updated. By way of some non-limiting examples, field 518 can be updated to display the generated code and field 512 can be updated to display the NL translation of the generated code displayed in field 518.

As shown in FIG. 6, process 600 can include step 612, which (as discussed in connection with step 408 of process 400 can be performed by feedback analysis module 308, can receive feedback, analyze the received feedback and make any changes to engine 300 identified based on the analysis of the received feedback. As discussed in connection with step 408, the feedback can be forwarded to other systems, such as code generation system 330—e.g., code generation system 330 can use the feedback to improve code generation based on NL request input.

In example 500 of FIG. 5, the contents of fields 506, 512 and 518 relate to SQL code generation. While SQL is used in various examples provided herein, it should be apparent that embodiments of the present disclosure can support any programming language. The contents of fields 506, 518 and 512 provide some illustrative examples and should not be construed as limiting in any way.

In example 500, NL input display field 506 can be used to receive new or modified NL query input. In example 500, NL input display field 506 can be used to receive a NL query as NL input into NL input display field 506. Field 518 can be used to display SQL code generated based on the NL query. Field 512 can be used to display a NL translation of the SQL code displayed in field 506. The SQL code displayed in field 518 can be processed by code processing system 340, which can be a database management system (DBMS) in this scenario.

By way of a non-limiting example, the DBMS can include a database (e.g., database 320) configured to store data in fields of tables of the database. DBMS can maintain metadata (e.g., database schema), or data about the data stored in the database, which can include information such as names of tables, names of fields, relationships between tables, etc.

Engine 300 can make use of NL versions (e.g., display versions) of table and field names, units used for fields, categorical values, etc. defined by the database's metadata to generate a NL translation for display in field 512 of GUI 502. By way of some non-limiting examples, a field that stores temperature data can be in degrees Celsius, a field storing financial data can be in dollars, etc. Similarly, states may be represented using two-letter postal codes in the database, but their display names may be their state names.

Code generation system 330 can use generated AI (or genAI) that is based on a large-language model (LLM), which can be tuned on data related to the topic of the database, on the query code language, on the database's metadata, on NL display versions of table and field names, etc.

In accordance with one or more embodiments, NL generation module 304 can be configured to translate a query generated by code generation system 330 to natural language. By way of some non-limiting examples, the NL translation generated by NL generation module 304 can use display versions of names of tables and fields in place of the table and field names defined by the metadata.

By way of a further non-limiting example, NL generation module 304 can analyze the query generated by code generation system by parsing the query to identify constructs (e.g., metadata table and fields names, query language commands, etc.) in accordance with the syntax used by the query language (e.g., SQL), analyze the identified constructions and syntax, generate the NL translation using the identified constructs and mappings between the language constructs and NL counterparts. Some non-limiting examples of generating a NL translation from SQL query code follow.

By way of a non-limiting example, an SQL command such as "SELECT" can be mapped to one or more NL versions (e.g., "Show", "Find" etc.), which can be used to generate the NL translation. Where there are multiple NL versions mapped to a given command (or other construct), NL generation module 304 can randomly select one or more of the NL versions to aid with user engagement. Feedback analysis module 308 can use feedback (e.g., time taken to approve or reject or to edit the NL translation) determine NL version(s) are most effective for users in general or specific users.

Table names and field names defined by the metadata and used internally by the DBMS can be mapped to corresponding display names which can be used in generating the NL translation. By way of a non-limiting example, "nyse_equities" can be mapped to "NYSE stocks". Using display names rather than internal names can also provide a level of security for the database—i.e., table and field names used internally the database can remain secure such that users (e.g., third-party users) are not provided with such internal information.

Other query language constructs such as operators can be mapped to NL counterparts. By way of a non-limiting example, an "<=" operator can be mapped to "at most".

A query language's syntax can dictate a specific order that can be difficult for a user to decipher or understand. NL generation module 304 can use an order that differs from the query language's syntactic ordering. By way of a non-limiting example, "WHERE trailing_pe<=5" can be converted to "with a 5 or lower PE ratio".

A query language's syntax may require certain special characters, punctuation, symbols, etc., which can be removed when generating a NL translation. By way of a non-limiting example, the semicolon at the end of a SQL query can be eliminated by the NL generation module 304 when generating the NL translation.

Logical operators (e.g., "AND", "OR", "NOT", etc.) can be converted to NL versions. By way of a non-limiting example, "OR" used in query code can be converted to "and/or" in natural language.

Numerical data representations used internally by the DBMS can be converted to NL versions. By way of some non-limiting examples, "9000000000" can be converted to "nine billion" or "9bn". Additionally, units can be added to numbers in the NL version. By way of a non-limited example, the number representing US dollars (e.g., "14000000") can be converted to "$14 million".

Other syntactic constructs used in query languages can involve nesting. By way of a non-limiting example, a query language can use special characters (e.g., parentheses) to express nesting. NL generation module 304 can use NL mappings (e.g., spacing, indentation, and/or guide words) to express such nesting. By way of a non-limiting example, "WHERE (hq_location='Cleveland') AND (market_cap>14000000 OR vertical='automotive')" can be translated to "with headquarters in Cleveland and either market capitalization over $14m or in the auto sector."

A query language such as SQL can use a "Join" operator to join database tables. NL generation module 304 can translate these operators into NL versions. By way of a non-limiting example, where a fact table is joined with a dimension table, NL translations can follow a pattern used for SELECT such as "Show" or "Find". By way of another non-limiting example, where two dimension tables are joined (or self joins), words like "matches" can be used. By way of some other non-limiting examples, outer, left and inner joins can be translated into "All from display-_name_of_table1" such that "some_from_display-_name_of_table2".

In accordance with one or more embodiments, NL generation module 304 can generate more than one NL translation and GUI generation module 306 can display the NL translations as multiple choices corresponding to code generated by code generation system 330. By way of a non-limiting example, interface module 302 can request that code generation system 330 generate multiple executed code instances—i.e., multiple queries—using a query language. NL generation module 304 can generate a NL translation for each instance using the NL versions mapped to the query language. GUI generation module 306 can display each executed code instance along with the corresponding NL translation. The user can select one of the choices (e.g., by selecting the "Submit" control element associated with one of the generated code choices) to be processed by code processing system 340. The user can select one of the NL versions for editing (e.g., editing the contents of field 512 corresponding to one of the choices and/or requesting suggestions for some or all of the contents) and then request that the modified contents be used to generate code (e.g., by selecting the "Submit" control element associated with field 512).

In accordance with one or more embodiments, GUI generation module 306 can present (e.g., via a dropdown menu) suggested edits that can be based on a set of candidate corrections that are stored (e.g., in database 320) by engine 300. By way of a non-limiting example, "forward PE ratio" can be a suggested edit to replace "trailing PE ratio" in NL input or NL translation presented by GUI generation module 306. Feedback analysis module 308 can store suggested edits on a per-system or per-user basis. By way of a non-limiting example, user input (e.g., user selection of a suggested edit) can be used as feedback by feedback analysis module 308 to learn which options are more standard (e.g., standard options might be offered before less standard, more non-standard options). By way of a further non-limiting example, user input can be used by feedback analysis module 308 to alter a suggestion list (e.g., suggested edits), to offer the most popular suggestions at the top of the list, etc.

As discussed, GUI generation module 306 can update the GUI (e.g., GUI 502) to display processing results, warnings, exceptions, errors, etc. generated by code processing system 340 using the generated code. By way of non-limiting example, generated code in the form of a query can be run against a database, or a subsample of the database, to determine whether it executes. Where the code executes and returns a set of results (or a subsample of results), GUI generation module 306 can update the GUI to include a status of the execution (e.g., whether any errors or exceptions were encountered during the execution), results of the execution, etc. The GUI can also display one or both of the NL input and the NL translation with the execution results, warnings, exceptions, errors, etc.

In accordance with one or more embodiments, query contents of field 518 can be processed by a database query planner, prior to executing the query, to estimate how long the query is likely to take to execute. This information can be used by GUI generation module 306 to update the GUI to include the estimated run time determined by the query planner. With reference to GUI 502 of FIG. 5, the query planner information can be displayed in field 524 along with one or more of NL input (displayed in field 506), NL translation (displayed in field 512), and the generated query code (displayed in field 518. By way of a non-limiting example, the query planner output can enable the user to determine whether to submit the query for execution or to narrow the scope of the query to attempt to decrease execution time.

In accordance with one or more embodiments, engine 300 can comprise a number of NL generation modules 304. As discussed herein, code can be generated from NL input (e.g., NL input from a user) as well as from a NL translation (e.g., an edited NL translation). By way of a non-limiting example, different NL generation modules 304 can be used based on whether the generated code corresponds to the NL input or an edited NL translation. An NL translation generated from code and then edited can have more structure than the original NL input used to generate the code. As such, the code generated from the edited NL translation may have more structure. In such a scenario, a second NL generation module 304 different from a first NL generation module 304 used to generate the (unedited) NL translation corresponding to the NL input's generated code may be more effective (than the first NL generation module 304) at generating a NL translation from generated code corresponding to edited NL translation.

As shown in FIG. 7, internal architecture 700 of a computing device(s), computing system, computing platform, user devices, set-top box, smart TV and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 708 and/or CD/DVD Drive Interface 720 as an interface for a drive that can read and/or write to media, display interface 710 as interface for a monitor or other display device, keyboard interface 716 as interface for a keyboard, pointing device interface 718 as an interface for a mouse or other pointing device, and miscellaneous other interfaces 722 not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through at least one communications interface carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:

receiving, at a computing device, from a user, a code translation request in connection with code generated by a code generation system based on natural language (NL) input;

analyzing, via the computing device, the computer-generated code and automatically generating a natural language (NL) translation of the computer-generated code based on the analysis, the analysis comprising parsing the computer-generated code to identify constructs in accordance with a syntax of a programming language used in generating the computer-generated code;

generating, via the computing device, a graphical user interface (GUI) comprising the NL input, the NL translation of the computer-generated code and GUI control elements for receiving input from the user in connection with at least one of the NL input and the NL translation;

causing, via the computing device, the GUI to be displayed at a client device of the user; and receiving, at the computing device, input from the user via at least one GUI control element and causing performance of at least one operation in response to the input.

2. The method of claim 1, wherein the NL input is received via the GUI and the at least one operation comprises requesting the code generation system to generate the computer-generated code.

3. The method of claim 1, wherein received user input comprises changes to the NL translation and the at least one operation comprises requesting the code generation system to generate updated computer-generated code.

4. The method of claim 1, wherein the GUI further comprises the computer-generated code.

5. The method of claim 4, wherein received user input comprises a request for the computer-generated code to be processed by a code processing system and the at least one operation comprises requesting the code processing system to process the computer-generated code.

6. The method of claim 5, wherein the processing request comprises a request to evaluate the computer-generated code prior to execution of the computer-generated code.

7. The method of claim 5, further comprising:

receiving, via the computing device, from the code processing system, results of processing the computer-generated code; and causing, via the computing device, the GUI displayed at the client device to be updated to include the processing results received from the code processing system.

8. The method of claim 5, further comprising:

receiving, via the computing device, from the code processing system, a warning regarding the computer-generated code; and causing, via the computing device, the GUI displayed at the client device to be updated to include the warning received from the code processing system.

9. The method of claim 5, further comprising:

receiving, via the computing device, input from the user via at least one GUI control element, the user input comprising a request for suggested edits to either the NL input or the NL translation; and causing, via the computing device, the GUI displayed at the client device to be updated to include at least one suggested edit in response to the request for suggested edits.

10. The method of claim 1, further comprising:

analyzing, via the computing device, the input received from the user; and updating, via the computing device, a NL generation module used in analyzing subsequent computer-generated and generating a NL translation based on the analysis.

11. The method of claim 1, further comprising:

forwarding, via the computing device, feedback based on the input received from the user to the code generation system.

12. The method of claim 1, further comprising:

replacing, via the computing device, the identified constructs with NL versions of the the identified constructs using a set of mappings.

13. A non-transitory computer-readable storage medium tangibly encoded with computer-executable instructions that when executed by a processor associated with a computing device perform a method comprising:

receiving, from a user, a code translation request in connection with code generated by a code generation system based on natural language (NL) input;

analyzing the computer-generated code and automatically generating a natural language (NL) translation of the computer-generated code based on the analysis, the analysis comprising parsing the computer-generated code to identify constructs in accordance with a syntax of a programming language used in generating the computer-generated code;

generating a graphical user interface (GUI) comprising the NL input, the NL translation of the computer-generated code and GUI control elements for receiving input from the user in connection with at least one of the NL input and the NL translation;

causing the GUI to be displayed at a client device of the user; and receiving input from the user via at least one GUI control element and causing performance of at least one operation in response to the input.

14. The non-transitory computer-readable storage medium of claim 13, wherein the NL input is received via the GUI and the at least one operation comprises requesting the code generation system to generate the computer-generated code.

15. The non-transitory computer-readable storage medium of claim 13, wherein received user input comprises changes to the NL translation and the at least one operation comprises requesting the code generation system to generate updated computer-generated code.

16. The non-transitory computer-readable storage medium of claim 13, wherein the GUI further comprises the computer-generated code and the received user input comprises a request for the computer-generated code to be processed by a code processing system and the at least one operation comprises requesting the code processing system to process the computer-generated code.

17. The non-transitory computer-readable storage medium of claim 16, wherein the processing request comprises a request to evaluate the computer-generated code prior to execution of the computer-generated code.

18. The non-transitory computer-readable storage medium of claim 16, the method further comprising:

receiving, from the code processing system, results of processing the computer-generated code; and causing the GUI displayed at the client device to be updated to include the processing results received from the code processing system.

19. The non-transitory computer-readable storage medium of claim 13, the method further comprising:

receiving input from the user via at least one GUI control element, the user input comprising a request for suggested edits to either the NL input or the NL translation; and causing the GUI displayed at the client device to be updated to include at least one suggested edit in response to the request for suggested edits.

20. A computing device comprising:

a processor; and a non-transitory storage medium for tangibly storing thereon program logic for execution by the processor, the program logic comprising:

receiving logic executed by the processor for receiving, from a user, a code translation request in connection with code generated by a code generation system based on natural language (NL) input;

analyzing logic executed by the processor for analyzing the computer-generated code and automatically generating a natural language (NL) translation of the computer-generated code based on the analysis, the analysis comprising parsing the computer-generated code to identify constructs in accordance with a syntax of a programming language used in generating the computer-generated code;

generating logic executed by the processor for generating a graphical user interface (GUI) comprising the NL input, the NL translation of the computer-generated code and GUI control elements for receiving input from the user in connection with at least one of the NL input and the NL translation;

causing logic executed by the processor for causing the GUI to be displayed at a client device of the user; and receiving logic executed by the processor for receiving input from the user via at least one GUI control element and causing performance of at least one operation in response to the input.

* * * * *